United States Patent
Aga et al.

(10) Patent No.: US 12,436,887 B1
(45) Date of Patent: Oct. 7, 2025

(54) DATA-DRIVEN PRECISION FOR MEMORY ACCESS

(71) Applicant: Advanced Micro Devices, Inc., Santa Clara, CA (US)

(72) Inventors: Shaizeen Dilawarhusen Aga, Santa Clara, CA (US); Nuwan S. Jayasena, Cupertino, CA (US); Mohamed Assem Abd Elmohsen Ibrahim, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/617,251

(22) Filed: Mar. 26, 2024

(51) Int. Cl.
*G06F 12/08* (2016.01)
*G06F 12/0802* (2016.01)

(52) U.S. Cl.
CPC ................ *G06F 12/0802* (2013.01)

(58) Field of Classification Search
CPC .................................... G06F 12/0802
See application file for complete search history.

(56) References Cited

U.S. PATENT DOCUMENTS

| | | | | |
|---|---|---|---|---|
| 2003/0081458 A1* | 5/2003 | Kurihara | ............ | G11C 16/0475 365/185.03 |
| 2003/0084245 A1* | 5/2003 | Tanaka | ................ | G06F 12/0893 713/1 |

OTHER PUBLICATIONS

Rouhani, Bita Darvish, et al., "With Shared Microexponents, A Little Shifting Goes a Long Way", ISCA '23: Proceedings of the 50th Annual International Symposium on Computer Architecture [Nov. 6, 2023]. Retrieved from the Internet <https://arxiv.org/pdf/2302.08007.pdf>, Feb. 16, 2023, 13 pages.

* cited by examiner

*Primary Examiner* — Jae U Yu
(74) *Attorney, Agent, or Firm* — FIG. 1 Patents

(57) ABSTRACT

Systems and techniques for data-driven precision memory access of cache block data are described. Computing system components are informed as to instances where access operations involve deducing a necessary precision of the data format and expressing the requested data in a lower-precision data format with minimal to no accuracy loss. In one example, executable code for a computational task includes hints that identify when memory requests involve accessing data in a numeric data format based on a deduced precision of the stored data during memory access. The described techniques thus overcome conventional drawbacks facing systems that transmit and compute data in a higher-precision data format than required by the stored values.

20 Claims, 5 Drawing Sheets

Figure 1:
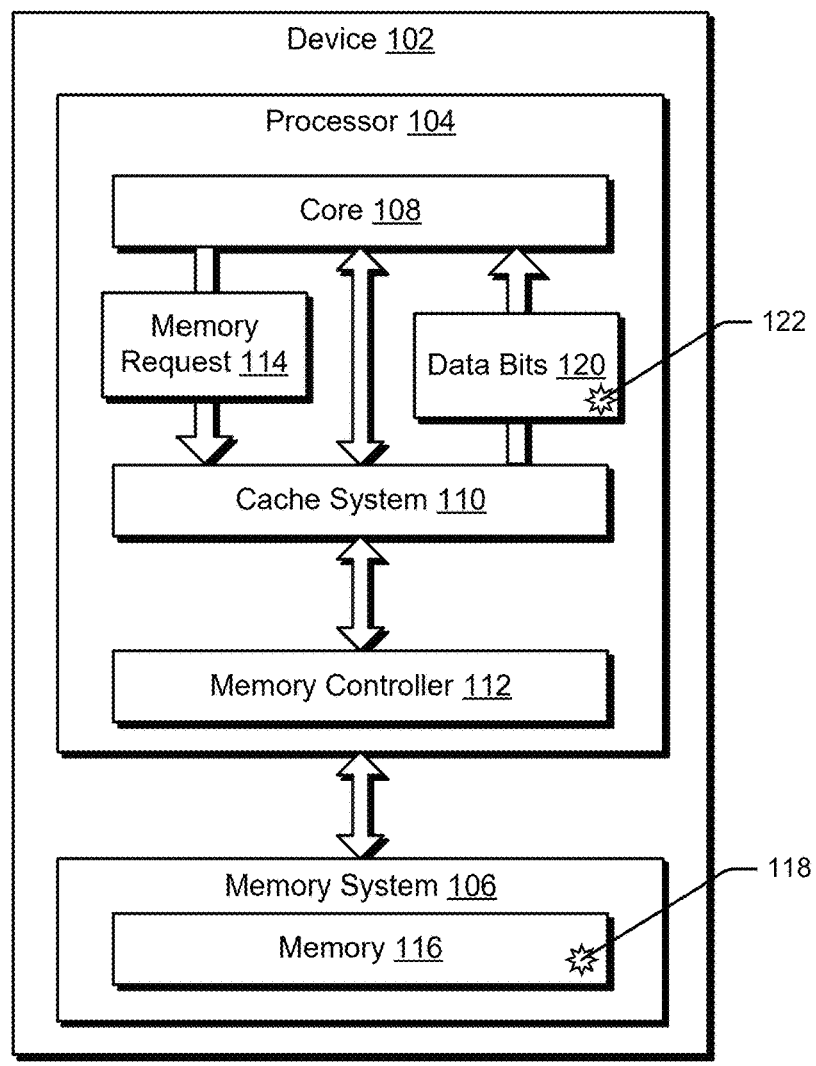

DATA-DRIVEN PRECISION FOR MEMORY ACCESS

BACKGROUND

Computing systems employ memory devices and associated memory controllers to manage data storage and control how data is made available to processing devices (e.g., central processing units, graphics processing units, auxiliary processing units, parallel accelerated processors) for computations. As such, precision and efficiency in data format bit-size directly affect their operation, examples of which include processing speed, bandwidth, and power consumption. Conventional techniques for data format sizing, however, involve storing, accessing, and computing data in a uniform high-precision data format (e.g., maintaining a data set as 32-bit values), with the optimistic assumption that this allows a processing device to perform computations without accuracy loss.

BRIEF DESCRIPTION OF THE DRAWINGS

FIG. 1 is a block diagram of a non-limiting example system having a device that implements a processor and memory system to implement techniques for memory access using data-driven precision.

FIG. 2 is a block diagram of a non-limiting example system showing a device employing a precision and metadata unit at one or more device components to implement techniques for memory access using data-driven precision.

FIG. 3 is a block diagram of a non-limiting example system showing operation of a memory controller returning a partial and data-driven precision cache block in response to a memory request based on analysis of data included in a cache block retrieved from memory.

FIG. 4 is a block diagram of a non-limiting example system showing operation of a device writing data to a memory system based on a data-driven precision hint included in a write request.

FIG. 5 is a block diagram of a non-limiting example procedure that illustrates data-driven precision memory access of data included in a cache block in response to a memory request.

DETAILED DESCRIPTION

Conventionally, computing device system architectures leverage one or more processing units to perform computational tasks by processing data stored in memory. When performing a computational task, data is retrieved from the memory and transferred through one or more communication channels to a local cache accessible by the processing units. When stored in memory, data is conventionally stored in a cache block (also commonly referred to as a cache line or a cache slot), which refers to a contiguous range of addresses in memory. Each data element in a cache block is generally stored in the same numeric data format (e.g., a 32-bit format). For example, a cache block includes an array of values, with each value being expressed as a 32-bit integer. When a processing unit accesses data from the memory, instead of fetching specific bits of data or the cache block in the least precise numeric data format, the processing unit fetches the data in the same numeric data format as it is stored regardless of whether it could be expressed in a lower-precision data format with no or little accuracy loss.

Thus, in an exemplary conventional system where a processing unit needs 256 bits of data for a given computational operation, the host processor transmits a request for a data block in memory that includes that 256 bits of data. This request is translated to identify which chunk (e.g., cache block) of memory includes the requested data bits. If the data is stored in a cache block size of 512 bits with a 32-bit numeric data format, the memory request would cause the entire cache block of 512 bits to be retrieved from memory and communicated to a local cache that is accessible by the processing unit in the 32-bit numeric data format. After the cache block of data is written to the local cache in the 32-bit numeric data format, the conventional processing unit retrieves and performs computations on the 256 bits of data in the 32-bit format.

Such a conventional architecture and data transfer technique results from conventional computing system designs being optimistic about data precision and assuming that if a subset of data requires, for example, a 32-bit numeric data format to reflect its value accurately, it is predicted that each data set for a data array should be stored and computed on in the same numeric data format. Such an optimistic assumption thus results in system architectures being designed so that an entire tensor of data is stored in high-precision numeric data formats, and computations are performed by processors on high-precision formatted data. However, with advances in numeric data formats, such uniform use of data formats is not always needed to perform computational tasks with no or little accuracy loss, which results in computational inefficiencies and delays. For example, each bit of data transferred between components of a computing system (e.g., from system memory to a cache system to a processing unit) involves the consumption of power by the computing system and consumes limited bandwidth on a communication network that couples the system components. In addition, fewer computations can be performed in a 32-bit format as opposed to a 16-bit format with similar area requirements. Accordingly, transferring and processing data in an overly precise numeric data format reduces system optimization by decreasing computation speeds, consuming excess power, reducing available bandwidth, and requiring extra time to communicate data when responding to a request. When scaled to a system that handles numerous (e.g., billions) requests, these system inefficiencies become significantly pronounced.

In recent years, numeric data format innovations have led to the introduction of 16-bit (e.g., BF16 or bfloat 16), 8-bit (e.g., FP8 or 8-bit floating point), and additional formats (e.g., Microsoft® MX formats with 8 bits, 6 bits, 4 bits, etc.). Processor vendors have progressively added support for additional numeric data formats to harness the benefits of these algorithmic developments to fuel model scaling for machine learning and other high-computation tasks.

As the number of numeric data formats has increased, determining the minimum required precision for a given computation has remained challenging and often requires considerable experimentation. Consequently, optimistic precision is conventionally employed for data storage and computations. For example, for a given tensor, if some of the values in the tensor will require high precision, the entire tensor is stored in a high-precision numeric data format, and computations are performed on high-precision values. Even with analysis, the complexity and time required for determining the required data formats for every tensor in a complex computation can lead to conservative precision for storage and computations.

Some conventional solutions address this scenario by statically storing high-precision values but statically computing on lower-precision values. These decisions are made before runtime and can result in accuracy loss and inapplicability to many scenarios. Other solutions allow lower-precision input to be involved in multiplications, with accumulations occurring in a higher-precision data format. However, such inputs are read in a specified data format, and the precision required is not determined dynamically or at runtime. Yet other solutions track heuristics to select between different numeric data formats. These decisions, however, are made at a tensor level, and each value is stored and computed in the same data format.

Data-driven precision for memory access is described. In one or more implementations, the described techniques allow the processor core to hint to one or more system components (e.g., processing device, cache system, memory controller, memory system, and so forth) that the precision for values at a given memory location can be deduced at runtime based on stored values to potentially harness lower-precision numeric data formats. For instance, in the example scenario where the system stores and transmits a cache block in a 32-bit numeric data format, the described techniques inform system components that for a given memory access, the requested data is analyzed and expressed using a lower-precision format (e.g., a 16-bit format) if there is little or no accuracy loss. This allows the 512 bits of data in the specific cache block to be expressed as 256 bits using the 16-bit numeric data format. By informing system components as to data-driven precision for memory access, the described techniques enable selective precision for data access and transmission (e.g., only 256 bits of data are retrieved from memory and communicated via a data bus, via a network-on-chip, combinations thereof, and so forth), which avoids the latency and energy cost that would otherwise result in a conventional system architecture that transmits and computes on the requested data in the 32-bit data format. The described techniques also allow computing systems to harness higher compute throughput, lower data movement, and lower programmer burden (especially for machine learning, high-performance computing, and similar applications) by utilizing low-precision formats.

The techniques described herein are configured to inform one or more system components (e.g., memory, cache system, or processing unit) to deduce the precision of data from a cache block during a given memory access (e.g., during a read access, write access, or a combination thereof). In implementations, information describing the data-driven precision for a given memory access is specified via executable code for a computational task performed by a computing system. For example, in some implementations, the software includes specific hints in executable code for a computational task that specifies that the precision for values at a given memory location can be determined at runtime based on values stored at the requested memory location, thus allowing for the data to be transferred in a lower-precision numeric data format. If the values can be expressed in the lower-precision format with little or no accuracy loss, the values, along with metadata, are supplied to the processing unit in the lower-precision format.

In such an example, when performing one or more operations of a computational task, a host processor is informed via a hint included in the executable code of the computational task that a particular request for data involves accessing and transferring data potentially provided in a lower-precision data format. The host processor thus generates a memory request to include a data-driven precision hint, which informs other system components (e.g., a memory controller, a memory system, a cache system, and so forth) that the precision of the requested data is to be deduced or determined during the memory access. Thus, in one or more implementations, the host processor also inserts or embeds a hint (e.g., a data-driven precision hint) in the memory request as part of generating the memory request.

In some aspects, the techniques described herein relate to a system including a processor core configured to transmit a memory request for requested data stored in a memory, and in response to transmission of the memory request, receive the requested data expressed in a first numeric data format, the first numeric data format having a lower precision than a second numeric data format in which the requested data are expressed in the memory.

In some aspects, the techniques described herein relate to a system wherein the memory request includes instructions to determine the precision of the requested data stored in or retrieved from the memory, and an indication of the second numeric data format in which the requested data are expressed in the memory.

In some aspects, the techniques described herein relate to a system wherein the processor core is further configured to receive an indication that the requested data has been expressed in the first numeric data format, the first numeric data format requiring fewer data bits than the second numeric data format.

In some aspects, the techniques described herein relate to a system that further includes at least one of a cache system or a memory controller, and the cache system or the memory controller, collectively, are configured to: in response to the transmission of the memory request, receive the requested data that is expressed in the second numeric data format from the memory, and express the requested data in the first numeric data format in response to an accuracy loss of the requested data expressed in the first numeric data format instead of the second numeric data format being less than a predetermined loss threshold.

In some aspects, the techniques described herein relate to a system wherein the accuracy loss is equal to zero.

In some aspects, the techniques described herein relate to a system wherein the accuracy loss is less than a predetermined numerical value or a predetermined loss percentage.

In some aspects, the techniques described herein relate to a system wherein at least one of the memory controller or the cache system is further configured to write the requested data expressed in the first numeric data format to a cache of the cache system.

In some aspects, the techniques described herein relate to a system wherein the processor core is further configured to perform computations on the requested data utilizing functional units or arithmetic logic units configured to process data elements expressed in the first numeric data format.

In some aspects, the techniques described herein relate to a system wherein: the requested data is stored in the memory in a cache block that includes additional data, the cache block including a second amount of data, the system further includes at least one of a cache system or a memory controller, and the cache system or the memory controller, collectively, are configured to, in response to the transmission of the memory request, receive a subset of the cache block that includes the requested data and excludes the additional data, the subset of the cache block comprising a first amount of data that is smaller than the second amount of data.

In some aspects, the techniques described herein relate to a system wherein: the cache block is expressed in the memory in the first numeric data format, and the subset of the cache block is expressed in the second numeric data format.

In some aspects, the techniques described herein relate to a device that includes at least one of a cache system or a memory controller, the cache system or the memory controller, collectively, being configured to: receive, from a circuit board having memory, a cache block of data in response to a memory request from a processor core, the cache block of data being expressed in a first numeric data format, output the cache block of data with data bits of the cache block of data expressed in a second numeric data format that has lower precision than the first numeric data format, and store the data bits expressed in the second numeric data format in a cache level of the cache system.

In some aspects, the techniques described herein relate to a device wherein: the cache block of data includes requested data identified in the memory request and additional data, the cache block of data comprises a first amount of data, the memory controller or the cache system is further configured to, in response to a reception of the cache block of data, remove the additional data from the cache block of data to generate a reduced cache block of data, the reduced cache block of data comprising a second amount of data that is smaller than the first amount of data, and in outputting the cache block of data with the data bits expressed in the second numeric data format, the memory controller or the cache system is further configured to output the reduced cache block of data expressed in the second numeric data format.

In some aspects, the techniques described herein relate to a device wherein the processed data bits are associated with metadata bits indicating that the cache block has been processed to express the processed data bits in the second numeric data format.

In some aspects, the techniques described herein relate to a device wherein the metadata bits further indicate a precision level or a numeric data format of the second numeric data format.

In some aspects, the techniques described herein relate to a device wherein the memory controller or the cache system is further configured to infer a precision level or a numeric data format of the second numeric data format based on a mask length of the metadata bits.

In some aspects, the techniques described herein relate to a device wherein the memory request includes: instructions to determine the precision of the requested data as stored in or retrieved from the memory, and an indication of the first numeric data format in which the requested data are expressed in the memory.

In some aspects, the techniques described herein relate to a device wherein the memory controller or the cache system, collectively, are further configured to: determine whether the cache block of data comes from a predetermined range of addresses in the memory, and express the data bits in the second numeric data format in response to determining that the cache block of data comes from the predetermined range of addresses.

In some aspects, the techniques described herein relate to a device wherein the memory controller or the cache system, collectively, are further configured to express the data bits in the second numeric data format in response to an accuracy loss of the data bits in the second numeric data format instead of the first numeric data format being less than a predetermined loss threshold.

In some aspects, the techniques described herein relate to a device wherein the memory controller or the cache system, collectively, are further configured to: determine, for each data element of the cache block of data, whether an accuracy loss from expressing each data element in the second numeric data format or a third numeric data format is less than a predetermined loss threshold, the third numeric data format having lower precision than the second numeric data format, and express each data element in the second numeric data format or the third numeric data format in response to a determination that the accuracy loss is less than the predetermined loss threshold, the data element being expressed in the third numeric data format if the corresponding accuracy loss is less than the predetermined threshold.

In some aspects, the techniques described herein relate to a device that includes a processor core configured to: transmit a write request to store data in memory, the data being expressed in a first numeric data format, and cause the memory to store the data expressed in a second data format having a higher precision than the first numeric data format.

FIG. 1 is a block diagram of a non-limiting example system 100 having a processor and memory system to implement techniques for memory access using data-driven precision. Specifically, the system 100 depicts a device 102 that includes a processor 104 and a memory system 106 communicatively coupled with one another (e.g., via at least one bus structure, via a network-on-chip, or any type of interconnect that enables transfer of data between various system components described herein).

The techniques described herein are usable by a wide range of device configurations, including, by way of example and not limitation, computing devices, servers, mobile devices (e.g., wearables, mobile phones, tablets, laptops, augmented-reality devices, virtual-reality devices, headsets), processors (e.g., graphics processing units, central processing units, and accelerators), digital signal processors, machine learning inference accelerators, disk array controllers, hard disk drive host adapters, memory cards, solid-state drives, wireless communications hardware connections, automotive computers, Ethernet hardware connections, switches, bridges, network interface controllers, and other apparatus configurations. Additional examples include artificial intelligence training accelerators, cryptography and compression accelerators, network packet processors, and video coders and decoders.

The processor 104 includes at least one core 108, which may also be called a processing core. The core 108 is an electronic circuit (e.g., an integrated circuit) that performs various operations on or using data in the memory system 106. Example configurations of the processor 104 and core 108 include, but are not limited to, an arithmetic-logic unit (ALU), a central processing unit (CPU), a graphics processing unit (GPU), a field programmable gate array (FPGA), an accelerated processing unit (APU), and a digital signal processor (DSP). For example, the core 108 is a processing unit that reads and executes instructions (e.g., of a program), including adding data, moving data, performing computations on data, and branching. Although one core 108 is depicted in the illustrated example, in other variations, the processor 104 includes more than one core 108 (e.g., a multi-core processor).

The processor 104 includes a cache system 110 configured in hardware (e.g., as an integrated circuit) and communicatively disposed between the processor 104 and the memory system 106. The cache system 110 is configurable as integral with the core 108, as a dedicated hardware device apart from the processor 104, and so forth. The cache system 110 is also configurable for a variety of processor 104 configurations, such as a central processing unit cache, graphics processing unit cache, parallel processing unit cache, digital signal processor cache, and so forth.

The processor 104 also includes a memory controller 112, which is a digital circuit (e.g., implemented in hardware) that manages the flow of data to and from the memory system 106. In some implementations, the memory controller 112 is communicatively located between and interfaces with the core 108 and the memory system 106. By way of example, the memory controller 112 includes logic to read and write to the memory system 106. For instance, the memory controller 112 receives instructions (e.g., a memory request 114) from the core 108. The instructions involve accessing data stored in memory 116 of the memory system 106 and providing the data to the core 108 (e.g., for processing by the core 108).

The memory system 106 is implemented as a printed circuit board, on which memory 116 (e.g., physical memory) is placed (e.g., via physical and communicative coupling using one or more sockets). In other words, the memory 116 is mounted on a printed circuit board, and this construction, along with the communicative couplings (e.g., control signals and buses) and one or more sockets integral to the printed circuit board, form the memory system 106. Examples of the memory system 106 include, but are not limited to, a TransFlash memory system, a single in-line memory module (SIMM), a dual in-line memory module (DIMM), Rambus memory systems, small outline DIMM (SO-DIMM), and compression-attached memory system.

In one or more implementations, the memory system 106 is a single integrated circuit device that incorporates the memory 116 on a single chip. In some examples, the memory system 106 is formed using multiple chips of memory 116 that are vertically ("3D") stacked together, are placed side-by-side on an interposer or substrate, or are assembled via a combination of vertical stacking or side-by-side placement.

The memory 116 is a device or system that is used to store data, such as for immediate use in a device (e.g., by the core 108). In one or more implementations, the memory 116 corresponds to semiconductor memory, where data is stored within memory cells on one or more integrated circuits. In at least one example, the memory 116 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 116 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). Access to the memory system 106 for the processor 104 is controlled by using the memory controller 112.

The memory request 114 illustrates an example instruction received by the memory controller 112 to access data maintained in the memory 116. The memory request 114 represents a request made by the processor 104 (e.g., by the core 108) for data (e.g., requested data) involved as part of performing one or more operations of a computational task or program. In implementations where the requested data is not accessible via the cache system 110, the core 108 transmits the memory request 114 to the memory controller 112, which causes the memory controller 112 to forward the memory request 114 to the memory system 106. The memory request 114 includes information describing one or more bits of data maintained in memory 116 (e.g., by specifying a memory address, a range of memory addresses, or combinations thereof) corresponding to locations in the memory system 106 at which the requested data are stored. In one or more implementations, the core 108 also inserts or embeds a hint or instruction (e.g., a data-driven precision instruction) in the memory request 114 as part of generating the memory request 114. Alternatively or in addition, the core 108 inserts or embeds precision criteria in the memory request 114. Incorporating hints and precision criteria in the memory request 114 are discussed in more detail below.

In conventional systems, a memory request involves requesting a cache block of data that includes the requested bits. For example, if a computational task requires a data value that is stored as a 32-bit element and the system memory is configured using 512-bit cache blocks (with 16 elements of 32 bits), a memory request 114 for the requisite 32-bit data would cause the memory system 106 to respond to the memory request 114 by returning the 512-bit cache block that includes the requested 32-bit data in a 32-bit numeric data format. In contrast to such conventional systems, the techniques described herein configure the memory request 114 to specify that the cache block (or a portion of a cache block) is to be accessed and returned, such that the memory request 114 causes the memory system 106 to return data bits 120, where the data bits 120 represent the requested data. The requested data is stored in the memory 116 using a higher-precision numeric data format 118 (e.g., the 32-bit numeric data format). The data bits 120 provided to the core 108 are provided in a lower-precision numeric data format 122 (e.g., a 16-bit numeric data format) that has a lower precision than the higher-precision numeric data format 118 of the memory 116. Although the data bits 120 are provided in the lower-precision numeric data format 122, the value represented by the data bits 120 has no or minimal accuracy loss.

In implementations where it is known at compile time for a given computational task (e.g., known when writing executable code) that a memory request 114 involves accessing and computing on data that may be expressed (e.g., stored, recorded, or represented) using a numeric data format with less precision with little or no accuracy loss, the executable code is written to include a data-driven precision hint in the memory request 114. The data-driven precision hint informs various system components (e.g., the cache system 110, the memory controller 112, and/or the memory system 106) that the memory request 114 involves deducing or determining whether the requested data is expressed in a numeric data format with less precision with no or minimal accuracy loss, such that the memory system 106 is caused to transfer data bits 120 from the memory 116 in the lower-precision numeric data format 122 (e.g., rather than the higher-precision numeric data format 118). The data bits 120 in the lower-precision numeric data format 122 are then communicated (e.g., from the memory system 106 to the memory controller 112, the cache system 110, and finally the core 108) for use by the core 108 in executing one or more operations of a computational task. By including the data-driven precision hint, the different system components and communication channels connecting the different system components are informed as to a potential deviation from the standard practice of communicating a cache block of data (or a subset thereof) in the stored higher-precision numeric data format 118 in response to a memory request.

In many implementations, it is unknown at compile time for a computational task as to the specific precision of data values in the requested data (e.g., which segment of bits in the cache block may be formatted in 32-bit, 16-bit, 8-bit, etc. with little or no accuracy loss). Consequently, it is often impossible to author a priori precision hints into executable code for the computational task that accurately identifies the proper precision level of the numeric data format for a particular cache block.

To address this problem and account for data-driven precision in memory access at runtime for a computational task, the system 100 considers data-driven precision criteria associated with the memory request 114 (e.g., determine whether the requested data may be expressed in a 16-bit numeric data format as opposed to a 32-bit numeric data format in which the cache block is stored in the memory 116 with no or minimal accuracy loss) during runtime (e.g., during execution) of a computational task. In other words, the system 100 determines at runtime whether the data values can be expressed without loss of information or with the information loss being lower than a predefined threshold using the lower-precision numeric data format 122. If so, then the system 100 produces a processed cache block in the lower-precision numeric data format 122 and causes the processed cache block (or a subset thereof) to be returned to the core 108.

For instance, consider an example scenario where the memory request 114 includes data-driven precision criteria instructing a certain 32-bit portion of a 512-bit cache block to be returned. The data elements of the 512-bit cache block, including the requested 32-bit portion, are stored in a 32-bit numeric data format. The memory request 114 causes an entire 512-bit cache block (e.g., corresponding to a memory address specified in the memory request 114) to be accessed or retrieved from the memory 116. The system 100 analyzes the 512-bit cache block based on the data-driven precision criteria. If a 16-bit numeric data format (e.g., a first numeric data format) accurately expresses the data in the 32-bit numeric data format (e.g., a second numeric data format), the identified 512-bit cache block is returned as a 256-bit cache block of data formatted in the 16-bit numeric data format to the memory controller 112, which then causes the 256-bit cache block to be transmitted to the cache system 110. In this manner, the described techniques enable memory access and computations on data in a lower-precision numeric data format, even when the needed precision level of the cache block to be accessed is unknown until after beginning to execute a computational task.

By allowing the data format to be inferred at runtime based on the precision level of the data, the described systems and techniques make it easier to harness the benefits of low-precision data formats, thus allowing for improved compute throughput and lower data movement. Furthermore, the described systems and techniques are compatible with existing or conventional cache and memory infrastructure.

Figure 2:
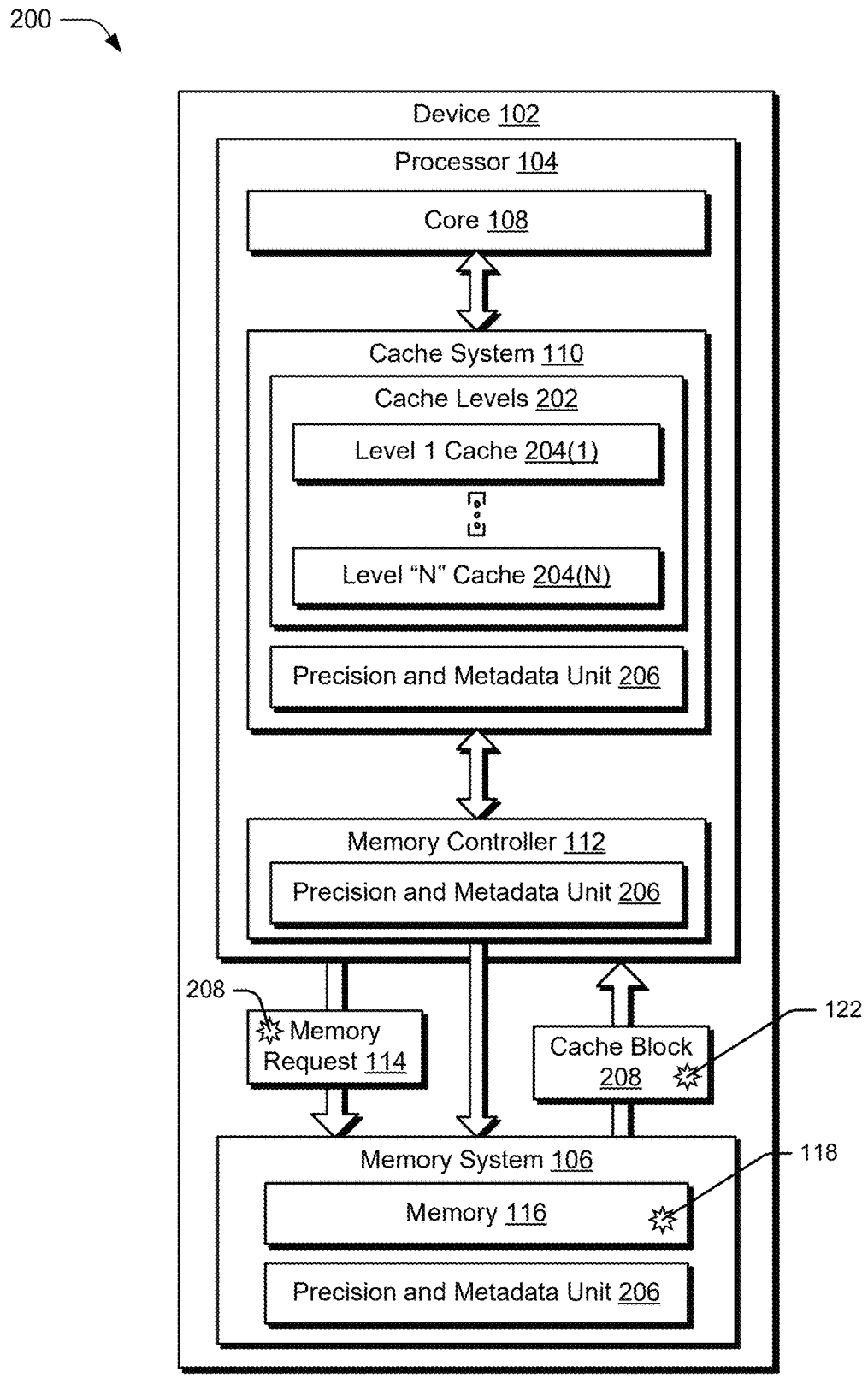

FIG. 2 is a block diagram of a non-limiting example system 200 showing a device employing a precision and metadata unit 206 at one or more device components to implement memory access using data-driven transfer precision. The system 200 implements a precision and metadata unit 206 to consider data-driven precision criteria associated with the memory request 114. In other words, the precision and metadata unit 206 determines that data values can be expressed without loss of information or with the information loss being lower than a predefined threshold using the lower-precision numeric data format 122. If so, then the precision and metadata unit 206 produces a processed cache block in the lower-precision numeric data format 122 and causes the processed cache block (or a subset thereof) to be returned to the core 108.

In FIG. 2, the cache system 110 is illustrated with greater detail than illustrated in FIG. 1. In particular, the processor 104 includes the cache system 110 having a plurality of cache levels 202, examples of which are illustrated as a level 1 cache 204(1) through a level "N" cache 204(N), where N is a positive integer. Configuration of the cache levels 202 as hardware is utilized to take advantage of a variety of locality factors. Spatial locality improves operation in situations in which request data is stored physically close to data of a previous request. Temporal locality is used to address scenarios in which data that has already been requested will be requested again.

In cache operations, a "hit" occurs at a cache level (e.g., cache level 204(1)) when data that is the subject of a load operation is available via the cache level 204, and a "miss" occurs when the requested data is not available via the cache level 204. When employing multiple cache levels 202, requests are processed through successive cache levels 202 until the data is located. The cache system 110 is configurable in various ways (e.g., in hardware) to address a variety of processor 104 configurations, such as a central processing unit cache, graphics processing unit cache, parallel processing unit cache, digital signal processor cache, and so forth.

As depicted in the illustrated example of FIG. 2, different instances of the precision and metadata unit 206 are implemented at the cache system 110, the memory controller 112, and the memory system 106. In response to a memory request 114 that includes a data-driven precision hint 208, the precision and metadata unit 206 (at any one of these system components) analyzes data included in a particular cache block during runtime for a computational task and accesses the cache block based on precision criteria. Thus, although described herein in the context of being implemented at a specific system component (e.g., at the memory system 106) for simplicity, the functionality of the precision and metadata unit 206 is performable by any system component implementing the precision and metadata unit 206. In this manner, the precision and metadata unit 206 is representative of an integrated circuit, software, or firmware configured to analyze a cache block (or a subset thereof) of data based on precision criteria associated with a memory request and return the cache block (or a subset thereof) in a numeric data format with the appropriate precision level.

In an exemplary operation of a conventional system, a read request is issued by a processing core to access or read a single 32-bit element belonging to a 512-bit cache block. If the requested 32-bit element misses on all cache levels, the request is then processed by a main memory system (e.g., high bandwidth memory), causing the 512-bit cache block to be read out of the main memory system and transferred to the cache system (e.g., via data fabric or network-on-chip linkage). The requested 32-bit element is eventually supplied to the processing core.

In contrast, the described systems and techniques enable the programmer or software of the core 108 to include the data-driven precision hint 208 in a memory request 114. The data-driven precision hint 208 uses a metadata bit or other bit to indicate to the precision and metadata unit 206 that the requested data is stored in the higher-precision numeric data format 118 (e.g., 32-bit format). The data-driven precision hint 208 also indicates that the precision and required precision of the data format can be inferred or determined for the particular memory request 114 at runtime.

For instance, in implementations where the precision and metadata unit 206 is implemented at the cache system 110, the data-driven precision hint 208 causes the precision and metadata unit 206 to analyze a cache block based on precision criteria associated with the memory request 114 that caused output of the cache block from memory 116 to the cache system 110. The data-driven precision hint 208 causes the precision and metadata unit 206 to determine whether the accuracy of the requested data can be maintained with little or no loss using a numeric data format with less precision. In an exemplary situation where a 512-bit cache block that is expressed using a 32-bit numeric data format (e.g., the higher-precision numeric data format 118) is returned to the cache system 110, the precision and metadata unit 206 writes the data elements of the cache block to a cache level 204 as 256-bit or 128-bit data portion that is expressed using a 16-bit or 8-bit numeric data format, respectively, (e.g., a lower-precision numeric data format 122) if the data elements of the cache block satisfy the precision criteria. The processed cache block (or another processed cache block) also includes metadata bits and some demarcation between the data portion and the metadata portion. The metadata bits assist subsequent components in the device 102 or the processor 104 to infer the precision of the elements in the processed cache block and the associated numeric data format. The functionality of the precision and metadata unit 206 is described in further detail below with respect to FIG. 5.

Figure 3:
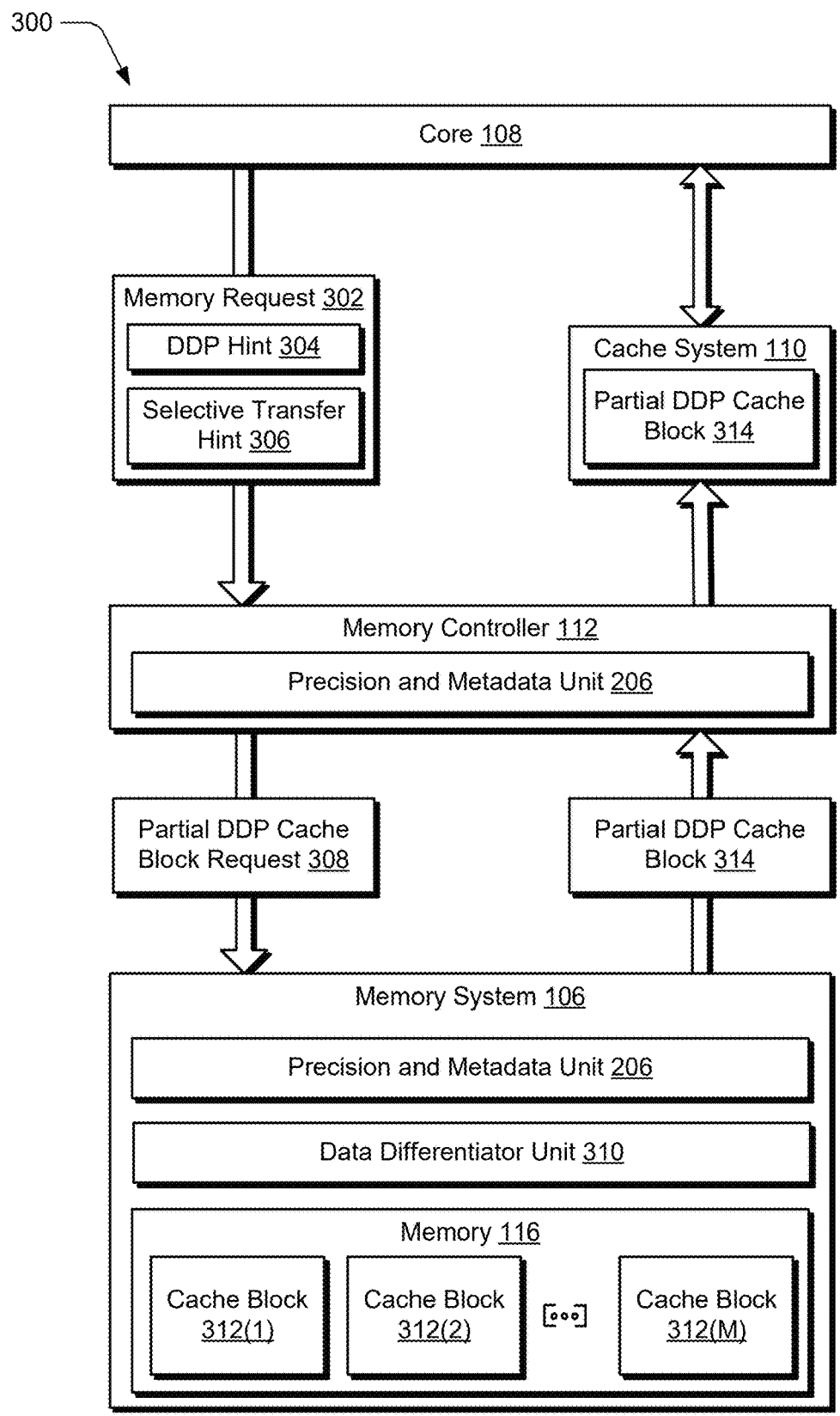

FIG. 3 is a block diagram of a non-limiting example system 300 showing operation of a memory controller returning a partial and data-driven precision cache block in response to a memory request based on analysis of data included in a cache block retrieved from memory. In the illustrated example of FIG. 3, the memory 116 is depicted as being organized by storing data in a plurality of cache blocks, examples of which are illustrated as cache block 312(1), cache block 312(2), . . . , cache block 312(M), where M represents any integer. Each cache block represents a contiguous range of addresses and associated data stored within the memory 116. In implementations, the size of a cache block is typically multiple bits (e.g., ranging from a few bits to a few hundred bits), and is dependent on the architecture of the system implementing the memory system 106 (e.g., 32-bit, 64-bit, 128-bit, 256-bit, and 512-bit cache blocks). The numeric data format in which the data in the cache blocks 312 is expressed or stored is also dependent on the system architecture or its programming (e.g., 4-bit, 6-bit, 8-bit, 16-bit, and 32-bit numeric data formats). Although described herein with respect to specific example sizes or numeric data formats, the size and numeric data format of cache block 312 are configurable to include any amount of data in any numeric data format in accordance with the described techniques.

The core 108 is depicted as generating and transmitting a memory request 302 that includes a data-driven precision hint 304 and a selective transfer hint 306. As described above, the data-driven precision hint 304 is representative of information or criteria (e.g., parameters, threshold values, etc.) that indicate that the precision of the requested data is to be deduced. The selective transfer hint 306 is representative of information or criteria indicating that less than an entirety of a cache block 312 is to be returned to the core 108 in response to the memory request 302. In implementations, a developer of a computer application (i.e., a computational task to be executed by the system 300) writes executable code of the computer application to instruct a data differentiator unit 310 when a particular memory request 302 is to deviate from a standard expectation of returning an entire cache block 312 in the stored numeric data format in response to a memory request 302 that requests a portion or subset of data included in the cache block 312 (e.g., the non-requested portion may be considered additional or extra data).

Conventional computing system designs are optimistic about data transfer and assume that if a request is received, for example, for eight bits of data, it is predicted that a subsequent request will need the next eight bits. Such an optimistic assumption thus results in system architectures being designed to transfer an entire cache block for a request that involves a subset of data stored in the cache block. However, with advances in computing device technology, such serialized use of data is not always performed, resulting in computational inefficiencies and delays. For instance, each bit of data transferred between components of a computing system (e.g., from system memory to a cache system to a processing unit) involves the consumption of power by the computing system and consumes limited bandwidth on a communication network that couples the system components. Accordingly, transferring even one bit of unnecessary data reduces system optimization by unnecessarily consuming excess power, reducing available bandwidth, and requiring extra time to communicate data when responding to a request. When scaled to a system that handles numerous (e.g., billions) of requests, these system inefficiencies become significantly pronounced.

To address these shortcomings, systems and techniques for selectively transferring one or more portions of a cache block in response to a request are described. The techniques are configured to inform each system component (e.g., processing device, cache system, memory controller, memory system, and so forth) as to how many bits of data are actually being requested by a memory request and thus informing system components as to instances where data transfer operations will involve moving less than an entirety of a cache block. For instance, in an example scenario where a system typically transmits an entire cache block of 64 bits in a standard memory access, the described techniques inform system components that for a given memory access only 16 bits of data will be transmitted. By informing system components as to the specific amount of data that will be transmitted during a given memory access, the described techniques enable selective data access and transmission (e.g., only 16 bits of a 64-bit cache block are retrieved from memory and communicated via a data bus, via a network-on-chip, combinations thereof, and so forth), which avoids the latency and energy cost that would otherwise result in a conventional system architecture that transmits the entire 64-bit cache block in response to a memory request for only the 16 bits of data required for a computational task.

Advantageously, the data-driven precision hint 304 and the selective transfer hint 306 enable a developer to cause the memory request 302 to return the portion of the cache block 312 that satisfies requirements of the selective transfer hint 306 (e.g., based on values of data bits included in the cache block 312) in a numeric data format that satisfies requirements of the data-driven precision hint 304, without prior knowledge of what data bit values in the cache block 312 will be upon issuance of the memory request 302 or the precision thereof. For instance, in some implementations, performing an operation of a computational task might involve processing only 128 bits of a cache block that includes 512 bits (e.g., a 128-bit segment of a cache block 312 that includes the least amount of zeroes). However, because specific values of each data bit included in the cache block 312 cannot be known before beginning execution of the computational task, executable code for the computational task is written to include a selective transfer hint 306 for the memory request 302 that causes analysis of specific bit values in a cache block at runtime by the data differentiator unit 310, so that the appropriate 128-bit segment (e.g., a reduced cache block of data) is returned in response to the memory request 302. Similarly, executable code for the computational task is written to include a data-driven precision hint 304 for the memory request 302 that causes precision analysis of the 128-bit segment, so that if little or no accuracy loss is possible, the appropriate 128-bit segment of data is returned in a lower-precision data format (e.g., as a 64-bit segment of data expressed in a 16-bit numeric data format).

Although depicted in the illustrated example of FIG. 3 as being implemented at the memory system 106, the data differentiator unit 310 is configured for implementation at any suitable system component in accordance with the described techniques. For instance, the data differentiator unit 310 can be employed at one or more of the cache system 110, the memory controller 112, or the memory system 106 to implement the selective cache block data transfer techniques described herein. In this manner, the data differentiator unit 310 is representative of an integrated circuit, software, firmware, or any combination thereof configured to analyze a cache block of data based on selective transfer criteria associated with a memory request and return a subset of the cache block as specified by the selective transfer criteria.

Alternatively or additionally, in some implementations the executable code of a computational task is written such that a range of addresses in memory 116 are allocated to indicate that a memory request 302 for data included in the range of memory addresses is intended to deduce the precision of the requested data and return only the specific bits of data requested by the memory request 302. For instance, executable code for a computational task is written such that upon memory allocation for the computational task, the memory 116 is allocated to define any request for data from a memory address range spanning the cache block 312(1) and the cache block 312(2) to indicate determination of the precision of the data and that less than an entirety of the respective cache block is returned in response to a memory request 302 for data stored in the corresponding cache block 312. In such implementations, the memory system 106 is informed at the time of memory allocation that any memory request 302 for data having an address encompassed by the range of memory addresses included in the cache block 312(1) and the cache block 312(2) is treated as having a data-driven precision hint 304 and a selective transfer hint 306, even if such a data-driven precision hint 304 and a selective transfer hint 306 is not explicitly included in the memory request 302. In a similar manner, the memory controller 112 is informed upon memory allocation that any requests for data corresponding to a range of memory addresses allocated will return only a portion of a cache block 312 in a data-driven deduced numeric data format and does not cause the return of an entire cache block 312 in necessarily the same stored numeric data format that includes data requested by the device 102. In other implementations, the precision and metadata unit 206 is programmed to ignore data-driven precision hints 304 in heavy-traffic scenarios.

Given such data-driven precision and selective transfer information (e.g., via the data-driven precision hint 304 and the selective transfer hint 306, via memory allocation defining a range of memory addresses, or combinations thereof), the memory controller 112 is configured to forward the memory request 302 as a partial data-driven precision (DDP) cache block request 308 to the memory system 106. The partial DDP cache block request 308 is representative of the memory request 302 with instructions for the memory system 106 to return only bits of data that are requested by the memory request 302 in a data-driven precision format, rather than an entirety of a cache block 312 that includes the requested data bits in the stored numeric data format.

The data-driven precision and specific data bits requested are depicted as the partial DDP cache block 314. The partial DDP cache block 314 represents a subset of bits of data included in one of the cache blocks 312(1)-(M) in a data-driven precision numeric data format, where each cache block 312 includes a first size of data in a first numeric data format and the partial DDP cache block 314 includes a second size of data that is smaller than the first size of data (e.g., fewer than all data bits maintained in a cache block 312) in a second numeric data format (e.g., lower-precision data format than that used for the data bits maintained in the cache block 312) if the precision of the data elements can be so expressed with little or no accuracy loss. The memory controller 112 is configured to write the partial DDP cache block 314 to one or more cache levels 202 of the cache system 110 for subsequent access by the core 108.

In this manner, the described techniques avoid the computational bandwidth usage, energy consumption, and transfer bandwidth limits of conventional system architectures, which would involve communicating an entire cache block 312 of data in a stored numeric data format from the memory system 106 to the memory controller 112 and finally to the cache system 110 so that the core 108 can read a portion of the cache block in a potentially over-precise numeric data format. Thus, the described techniques optimize processor computing throughput and energy consumption and avoid unnecessarily transmitting data in scenarios where a memory request 302 for a computational task involves only a subset of data maintained in a given cache block 312 that is stored in an overly precise numeric data format.

Although described herein and illustrated in FIG. 3 as being implemented at the memory system 106, the functionality of the data differentiator unit 310 to analyze and identify a portion of a cache block to return in response to a memory request 302 is configured for implementation at any one or combination of system components, such as at the memory controller 112, the cache system 110, the memory system 106, or combinations thereof.

In this manner, the described techniques avoid the energy consumption and bandwidth requirements of conventional system architectures, which would involve communicating the entire cache block 312 in the stored higher-precision numeric data format 118 from the memory system 106 to the memory controller 112 as well as writing the entire cache block 312 to the cache system 110 (e.g., so that the core 108 could later analyze the cache block 312 as maintained in the cache system 110 and select to access only the requisite subset of data needed for a computational task). Thus, the techniques described herein optimize energy consumption and avoid unnecessarily transmitting data between system components in scenarios where a memory request 302 for a computational task involves only a subset of data maintained in a given cache block 312, even in scenarios where it is unknown as to the specific location (e.g., addresses in memory 116) where the subset of the cache block 312 will be maintained before runtime for the computational task. In addition, the techniques described herein further optimize energy consumption, computing throughput, and transmission bandwidth by accessing and processing the requested data in a lower-precision or lowest-precision numeric data format (e.g., the lower-precision numeric data format 122) by reducing the bit size of the transmitted data and the number of processor resources needed to perform computations thereon.

Figure 4:
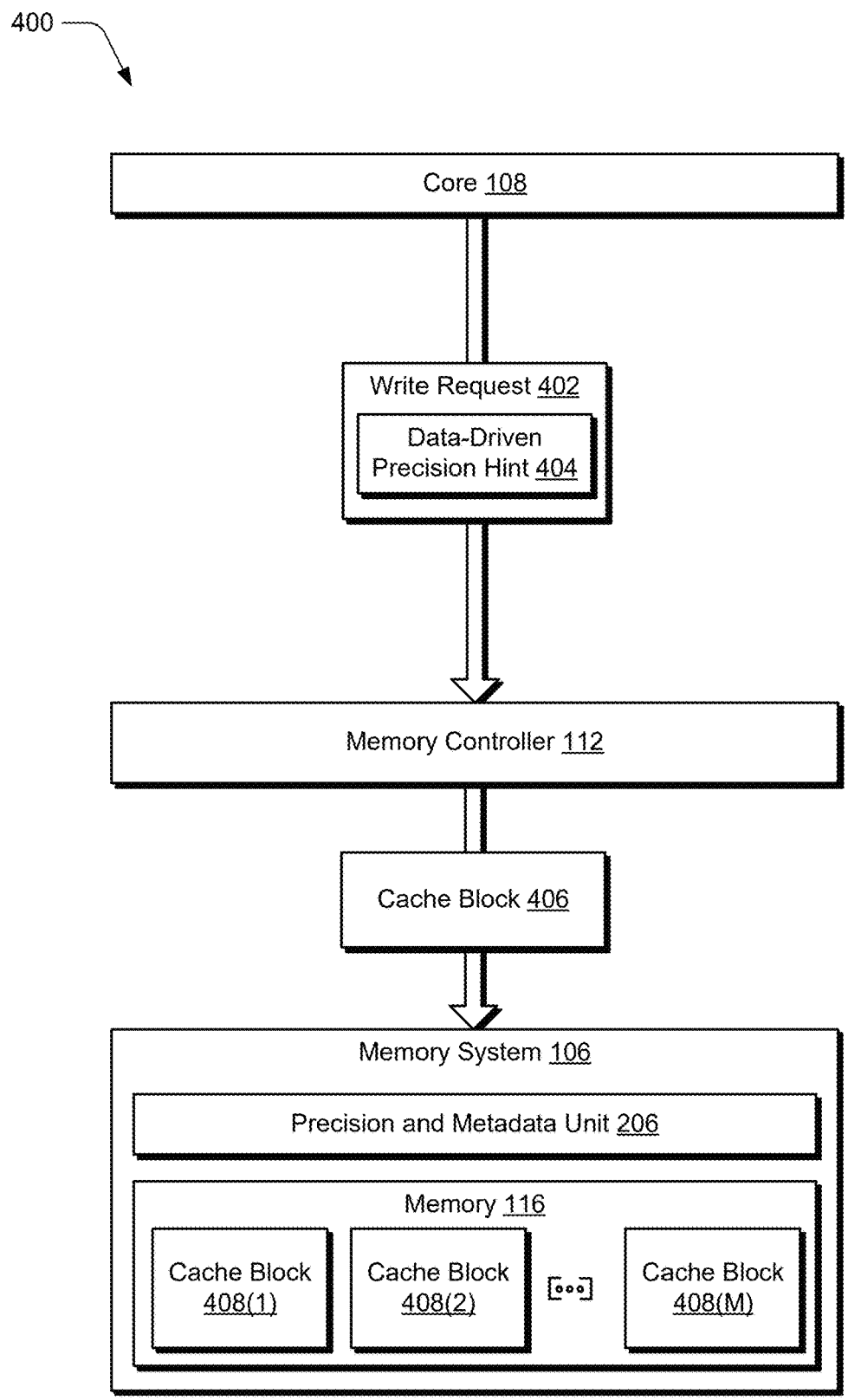

FIG. 4 is a block diagram of a non-limiting example system 400 showing the operation of a device writing data to the memory system 106 based on a data-driven precision hint 404 included in a write request 402 (e.g., instructions to write or store data in the memory system 106 to specified or unspecified addresses). Similar to the illustrated example of FIG. 3, memory 116 of the system 400 is depicted as being organized by storing data in a plurality of cache blocks 408, examples of which are illustrated as cache block 408(1), cache block 408(2), . . . , cache block 408(M), where M represents any positive integer. Each cache block represents a contiguous range of addresses and associated data stored within the memory 116.

In the illustrated example of FIG. 4, the core 108 is depicted as generating and transmitting a write request 402 that includes a data-driven precision hint 404. The data-driven precision hint 404 is representative of information or criteria (e.g., parameters, threshold values, etc.) that indicates that the precision of stored data in the memory 116 is to be deduced at the memory system 106. In an exemplary implementation, a cache block 406 is stored in the cache system 110 and expressed using a 16-bit numeric data format. The memory 116, however, stores the cache blocks 408 in a 32-bit numeric data format. In this scenario, the precision and metadata unit 206 processes the cache block 406 into the 32-bit numeric data format to match the numeric data format of the other elements in the cache block 408 in the memory 116. In this way, the described systems and techniques preserve the abstraction or precision-formatting of cache blocks and address to the same cache-block mapping as in the system's memory, which allows the described systems and techniques to be compatible with existing cache infrastructure (e.g., coherence and reliability, availability, and serviceability (RAS) strategies).

Figure 5:
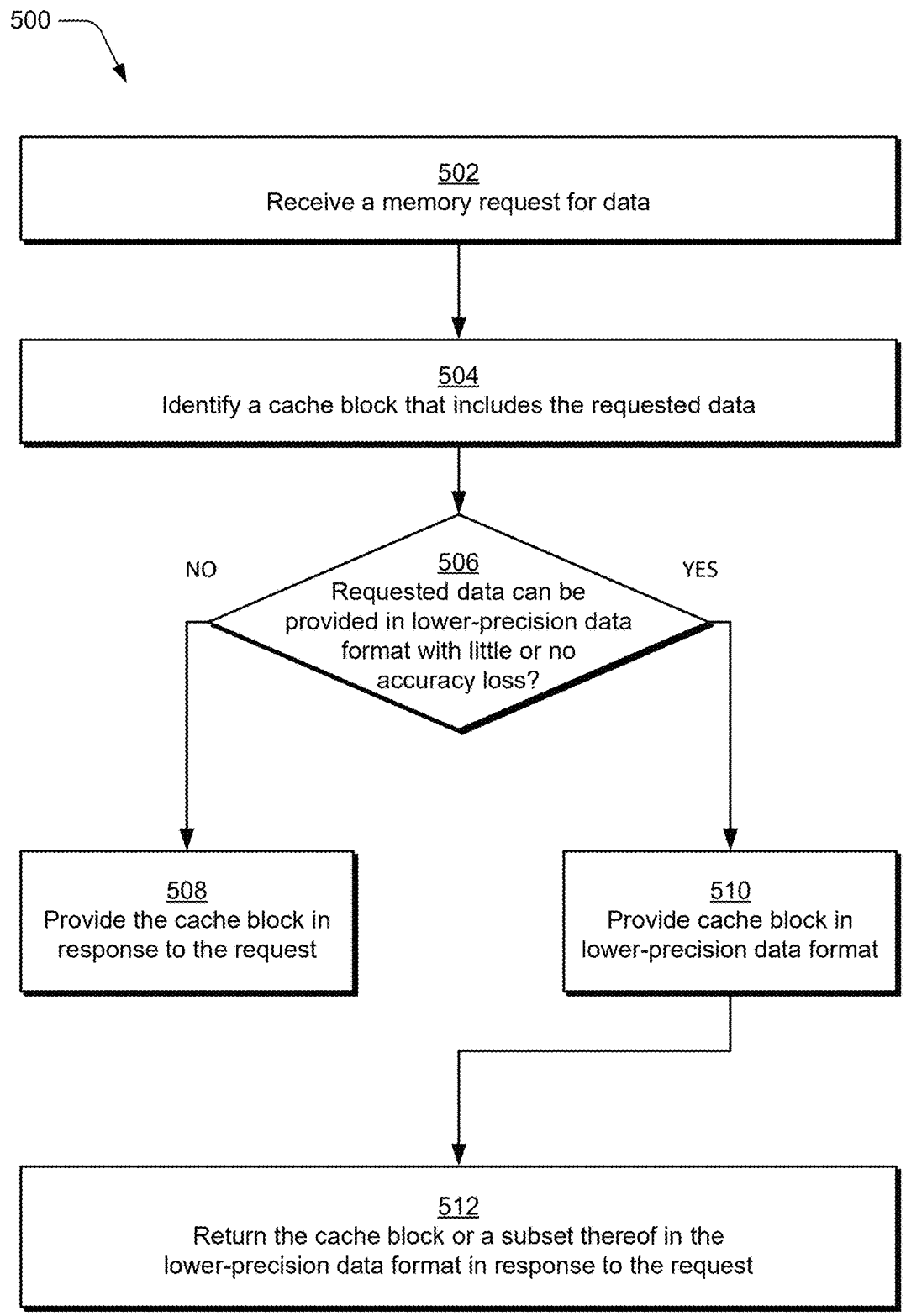

FIG. 5 is a block diagram of a non-limiting example procedure 500 that illustrates a stepwise algorithm for data-driven precision memory access of data included in a cache block in response to a memory request. The procedure 500 is shown as operations (or actions) performed, but not necessarily limited to the order or combinations in which the operations are shown herein. Any one or more operations may be repeated, combined, or reorganized to provide other algorithms. In portions of the following discussion, reference may be made to the systems and components of FIGS. 1 through 4, reference to which is made by example. The algorithm is not limited to performance by the mentioned systems and components.

To begin, a memory request for data is received (block 502). The memory controller 112, for instance, receives a memory request 114 from the core 108. The memory request, which may be any variant of known memory access instructions, includes instructions (e.g., the data-driven precision hint 208) via one or more bits that the precision of the requested data is to be inferred at runtime. The instructions also indicate the numeric data format (e.g., the higher-precision numeric data format 118) in which the requested data is stored at the memory system 106, which allows the precision and metadata unit 206 to determine or compute if using a different numeric data format (e.g., the lower-precision numeric data format 122) results in loss of information. Alternatively, the precision and metadata unit 206 infers the numeric data format of the requested data in the memory 116 without an indication thereof included in the memory request 114. In some implementations, the inferred precision of the requested data is limited to numeric data formats (e.g., different powers of two data formats) that are supported by the processor 104 or the core 108.

A cache block is then identified that includes the requested data (block 504). The memory controller 112, for instance, identifies at least one memory address included in the memory request 114 and identifies a corresponding cache block 312 in memory 116 that includes the memory address(es) corresponding to the requested data.

A determination is then made as to whether the requested data can be expressed in a lower-precision data format (e.g., a 16-bit numeric data format as opposed to a 32-bit numeric data format), requiring fewer data bits, with little or no accuracy loss (block 506). The precision and metadata unit 206 of the memory controller 112 or the memory system 106, for instance, is informed to deduce the precision of the requested data or the corresponding cache block when the memory request 114 includes a data-driven precision hint 304. The precision and metadata unit 206 is programmed to allow a specified degree of accuracy loss in deducing data formats by using a predetermined loss threshold. The specified degree of accuracy loss or predetermined loss threshold is no information loss, a predetermined loss percentage of accuracy loss (e.g., <0.1%), a predetermined numerical value or accuracy loss amount (e.g., <0.01), or any combination thereof that is acceptable.

In response to determining that the memory request 114 does not include a data-driven precision hint 304 or that the requested data (or the corresponding cache block) cannot be expressed using a lower-precision numeric data format with acceptable accuracy loss (e.g., a "No" determination at block 506), the cache block is provided in response to the request in the stored numeric data format (e.g., the higher-precision numeric data format 118) (block 508). For instance, in response to the memory request 114 not including a data-driven precision hint 304 or the precision criteria not being satisfied, the memory controller 112 forwards the memory request 114 to the memory system 106 in a manner that causes the memory system 106 to return the cache block 312 that includes the requested data in the higher-precision numeric data format 118 (e.g., as the cache block is expressed in the memory 116). The memory system 106 outputs the cache block 312, including the requested data, to the memory controller 112, the cache system 110, the core 108, or combinations thereof.

Alternatively, in response to determining that the requested data (or the corresponding cache block) can be expressed in a lower-precision numeric data format with acceptable accuracy loss (e.g., a "Yes" determination at block 506), the corresponding cache block (or the requested portion thereof as described in reference to FIG. 3) is expressed and provided in a lower-precision numeric data format (block 510). In such instances, the memory controller 112 communicates a data-driven precision cache block request to the memory system 106 that instructs the memory system 106 to return the requested cache block in the lower-precision numeric data format 122, rather than the higher-precision numeric data format 118. In an exemplary implementation, the precision level of the requested cache block is determined so that each data element therein satisfies the precision criteria. In an alternative implementation, the precision level can be set differently for each data element in the requested cache block.

The processed (or data-driven precision) cache block is also encoded (e.g., in metadata) with a precision-processing instruction (e.g., a single bit, which may be referred to as DDP tag bit(s)) associated with the response to indicate that the cache block has been processed by a precision and metadata unit 206. The precision-processing instruction is associated with the processed cache block and stored in the cache system 110. Each precision and metadata unit 206 that encounters that processed cache block checks whether data-driven precision processing is necessary. If a precision and metadata unit 206 detects that a cache block has been processed (e.g., via a DDP tag bit), the precision and metadata unit 206 skips processing the cache block, ensuring each system component infers a single precision level for a particular cache block and avoiding redundant processing.

In other implementations, different precision and metadata units 206 in the device 102 are assigned different objectives and process a particular cache block as it traverses the memory pipe. For example, the precision and metadata unit 206 in the memory system 106 is tasked with inferring the least bits or lowest-precision numeric data format required per data element in the requested cache block. The precision and metadata unit 206 in the cache system 110 (or nearest the core 108) produces data elements in the processed cache block in precision-compatible data formats for the computations by the core 108.

In addition or alternatively, the DDP tag bits include an instruction (e.g., one or more bits) that indicates the precision (or numeric data format) at which the data elements in the processed cache block is stored. The DDP tag bits are encoded into the residual bits along with zeroes as the rest of residual bits (e.g., comprising metadata bits for the processed cache block). A mask (e.g., a portion of the response to not be used as the requested data) including the DDP tag(s) and zeroes is provided as metadata for the processed cache block. The precision level of the processed cache block can also be inferred from the mask length (e.g., the number of zeroes included in the mask). In further embodiments, metadata bits can aid in handling data outliers in scenarios where the precision and metadata units 206 are programmed to allow for minimal accuracy loss.

In yet other implementations, the precision and metadata units 206 utilize compression support to avoid transferring unneeded residual bits (e.g., zeroes in the mask) and further optimize data transfer among the system components. For example, instead of inferring precision for each data-driven precision hint 304, the precision and metadata unit 206 has a local structure to cache metadata of frequently accessed locations or cache blocks. In another example, the precision and metadata unit 206 immediately sends the data bits of the processed cache blocks to the cache system 110 and delays sending the metadata (e.g., DDP tag(s)) associated with the multiple processed cache blocks. The delayed metadata from different requests can be packaged together to reduce transfer waste (e.g., unneeded residual bits). Similarly, the delayed metadata of one processed cache block piggybacks in the unneeded residual bits of another (future or contemporaneous) processed cache block.

The processed cache block (or a subset thereof) expressed in the lower-precision numeric data format is then returned in response to the request (block 512). The memory system 106, for instance, outputs the processed cache block in the lower-precision numeric data format 122 in response to the memory request 302 with the data-driven precision hint 304. Alternatively, the precision and metadata unit 206 outputs the DDP cache block by expressing the cache block in the lower-precision numeric data format 122.

The provision of a data-driven precision cache block with data elements expressed using the lower-precision numeric data format 122 allows the core 108 to have a higher compute throughput. For example, variable and dynamic precision arithmetic logic units (ALUs) are used to simply compute on the returned data elements (e.g., expressed at the lower-precision numeric data format 122), freeing up additional ALUs for other computations. The lower-precision numeric data format 122 for the returned data elements is inferred using the metadata (e.g., DDP tag(s)) associated with the processed cache blocks. In other implementations, if such ALUs are not available, computation instructions that consume responses to memory requests 302 with DDP hints 304 optimistically reserve additional functional units (e.g., reserve a 32-bit adder and 16-bit adder) to perform computations on the returned cache blocks. Once responses are received to the memory requests 302 with DDP hints 304, optimistically reserved functional units are released and only the needed functional units are kept or used for the computations. For example, if the returned data element is expressed in a 16-bit numeric data format, the core 108 releases the 32-bit adder. In other implementations, precision information associated with particular cache blocks or data elements is preserved in register files and used to determine the relevant functional units necessary for an upcoming computational task. In yet other implementations, processor front ends (e.g., of the processor 104) are modified to infer the precision information from the metadata (e.g., DDP tag(s)) of a particular data-driven precision cache blocks and factor this information into resource scheduling for compute instructions known to operate on the data elements associated with the particular data-driven precision cache block (e.g., schedule the ALUs or functional units with appropriate precision).

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein are implemented in any of a variety of different manners such as hardware circuitry, software, or firmware executing on a programmable processor, or any combination thereof. The methods provided are implemented in any of a variety of devices, such as a general-purpose computer, a processor, or a processor core. Suitable processors include, by way of example, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, and/or a state machine.

In one or more implementations, the methods and procedures provided herein are implemented in a computer program, software, or firmware incorporated in a non-transitory computer-readable storage medium for execution by a processor. Examples of non-transitory computer-readable storage mediums include read-only memory (ROM), random-access memory (RAM), registers, cache memory, semiconductor memory devices, magnetic media (e.g., internal hard disks or removable disks), magneto-optical media, and optical media.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
a processor core configured to:
transmit a memory request for requested data stored in a memory; and
in response to transmission of the memory request, receive the requested data expressed in a first numeric data format, the first numeric data format using fewer bits to express the requested data than a second numeric data format in which the requested data are expressed in the memory.

2. The system of claim 1, wherein the memory request includes:
instructions to determine a precision of the requested data stored in or retrieved from the memory; and
an indication of the second numeric data format in which the requested data are expressed in the memory.

3. The system of claim 2, wherein the processor core is further configured to receive an indication that the requested data has been expressed in the first numeric data format, the first numeric data format having a lower precision than the second numeric data format.

4. The system of claim 2, wherein:
the system further includes at least one of a cache system or a memory controller; and
the cache system or the memory controller, collectively, are configured to:
in response to the transmission of the memory request, receive the requested data that is expressed in the second numeric data format from the memory; and
express the requested data in the first numeric data format in response to an accuracy loss of the requested data expressed in the first numeric data format instead of the second numeric data format being less than a predetermined loss threshold.

5. The system of claim 4, wherein the accuracy loss is equal to zero.

6. The system of claim 4, wherein the accuracy loss is less than a predetermined numerical value or a predetermined loss percentage.

7. The system of claim 4, wherein at least one of the memory controller or the cache system is further configured to write the requested data expressed in the first numeric data format to a cache of the cache system.

8. The system of claim 1, wherein the processor core is further configured to perform computations on the requested data utilizing functional units or arithmetic logic units configured to process data elements expressed in the first numeric data format.

9. The system of claim 1, wherein:
the requested data is stored in the memory in a cache block that includes additional data, the cache block including a first amount of data;
the system further includes at least one of a cache system or a memory controller; and
the cache system or the memory controller, collectively, are configured to, in response to the transmission of the memory request, receive a subset of the cache block that includes the requested data and excludes the additional data, the subset of the cache block comprising a second amount of data that is smaller than the first amount of data.

10. The system of claim 9, wherein:
the cache block is expressed in the memory in the second numeric data format; and
the subset of the cache block is expressed in the first numeric data format.

11. A device comprising at least one of a cache system or a memory controller, the cache system or the memory controller, collectively, being configured to:
receive, from a circuit board having memory, a cache block of data in response to a memory request for requested data from a processor core, the cache block of data being expressed in a first numeric data format;
output the cache block of data with data bits of the cache block of data expressed in a second numeric data format that has lower precision than the first numeric data format; and
store the data bits expressed in the second numeric data format in a cache level of the cache system.

12. The device of claim 11, wherein:
the cache block of data includes requested data identified in the memory request and additional data;
the cache block of data comprises a first amount of data;
the memory controller or the cache system is further configured to, in response to a reception of the cache block of data, remove the additional data from the cache block of data to generate a reduced cache block of data, the reduced cache block of data comprising a second amount of data that is smaller than the first amount of data; and
in outputting the cache block of data with the data bits expressed in the second numeric data format, the memory controller or the cache system is further configured to output the reduced cache block of data expressed in the second numeric data format.

13. The device of claim 11, wherein the data bits are associated with metadata bits indicating that the cache block has been processed to express the data bits in the second numeric data format.

14. The device of claim 13, wherein the metadata bits further indicate a precision level or a numeric data format of the second numeric data format.

15. The device of claim 13, wherein the memory controller or the cache system is further configured to infer a precision level or a numeric data format of the second numeric data format based on a mask length of the metadata bits.

16. The device of claim 11, wherein the memory request includes:
instructions to determine a precision of the requested data as stored in or retrieved from the memory; and
an indication of the first numeric data format in which the requested data are expressed in the memory.

17. The device of claim 11, wherein the memory controller or the cache system, collectively, are further configured to:
determine whether the cache block of data comes from a predetermined range of addresses in the memory; and
express the data bits in the second numeric data format in response to determining that the cache block of data comes from the predetermined range of addresses.

18. The device of claim 11, wherein the memory controller or the cache system, collectively, are further configured to express the data bits in the second numeric data format in response to an accuracy loss of the data bits in the second numeric data format instead of the first numeric data format being less than a predetermined loss threshold.

19. The device of claim 11, wherein the memory controller or the cache system, collectively, are further configured to:

determine, for each data element of the cache block of data, whether an accuracy loss from expressing each data element in the second numeric data format or a third numeric data format is less than a predetermined loss threshold, the third numeric data format having lower precision than the second numeric data format; and express each data element in the second numeric data format or the third numeric data format in response to a determination that the accuracy loss is less than the predetermined loss threshold, each data element being expressed in the third numeric data format if a corresponding accuracy loss is less than the predetermined loss threshold.

20. A device comprising:

a processor core configured to:

transmit a write request to store data in memory, the data being expressed in a first numeric data format; and cause the memory to store the data expressed in a second numeric data format, the second numeric data format using more bits to express the data than the first numeric data format.

* * * * *